(12) United States Patent
Martin et al.

(10) Patent No.: US 6,301,193 B1
(45) Date of Patent: Oct. 9, 2001

(54) FLOATATION DEVICE FOR MARINE SEISMIC ENERGY SOURCES

(75) Inventors: Dallas Martin; David C. Charvoz, both of Friendswood, TX (US)

(73) Assignee: Input/Output, Inc., Stafford, TX (US)

( * ) Notice: Subject to any disclaimer, the term of this patent is extended or adjusted under 35 U.S.C. 154(b) by 0 days.

(21) Appl. No.: 09/270,553

(22) Filed: Mar. 16, 1999

(51) Int. Cl.$^7$ ..................................................... G01V 1/38
(52) U.S. Cl. ................................................. 367/16; 367/20
(58) Field of Search ...................... 367/16, 20; 702/14, 702/16

(56) References Cited

U.S. PATENT DOCUMENTS

| | | | |
|---|---|---|---|
| 4,038,630 | * 7/1977 | Chelminski | 340/7 R |
| 4,552,086 | 11/1985 | Böe et al. | 114/242 |
| 4,686,660 | 8/1987 | Gjestrum et al. | 367/153 |
| 4,716,553 | 12/1987 | Dragsund et al. | 367/15 |
| 4,831,599 | 5/1989 | Dragsund et al. | 367/15 |
| 5,144,588 | 9/1992 | Johnston et al. | 367/16 |
| 5,319,609 | * 6/1994 | Regnault | 367/16 |
| 5,943,293 | * 8/1999 | Luscombe et al. | 367/20 |
| 6,011,753 | * 1/2000 | Chien | 367/21 |
| 6,026,056 | * 2/2000 | Lunde et al. | 367/23 |

* cited by examiner

*Primary Examiner*—Hezron Williams
*Assistant Examiner*—Victor J. Taylor
(74) *Attorney, Agent, or Firm*—Madan, Mossman & Sriram, PC

(57) ABSTRACT

A floatation device for marine seismic energy sources. The floatation device includes one or more tubular members and a plurality of couplings for sealing and coupling the tubular members to one another. The couplings include an air valve for filling the tubular members with air. One or more marine seismic energy sources are preferably coupled to and supported by the floatation device.

14 Claims, 14 Drawing Sheets

FLOATATION DEVICE FOR MARINE SEISMIC ENERGY SOURCES

BACKGROUND OF THE INVENTION

This invention relates generally to marine seismic surveying and more particularly to floatation system for use in marine seismic surveying.

In marine seismic surveying, to obtain geophysical information relating to the substrata located below the sea bottom, seismic sources, generally acoustic transmitters, adapted to produce pressure pulses or shock waves under water, are towed beneath the water surface behind a marine vessel. The shock waves propagate into the substrata beneath the sea where they are refracted and reflected back to the sea. The returning shock waves are detected by sensors (usually hydrophones) and the useful data contained in the signals produced by the sensors is processed to determine the geophysical structure of the substrata.

Air guns or gas guns are frequently used as acoustic transmitters. Usually, several air guns are placed in spaced relation to each other in a subarray. One or more air gun subarrays are towed behind a marine vessel beneath the sea surface. During operation, all air guns in a subarray are activated simultaneously to produce a desired overall pressure pulse from that subarray. The pulse characteristics, such as the frequency, bubble ratio and amplitude, of the overall pressure pulse produced by an air gun subarray is a function of the characteristics of the pressure pulses produced by the individual air guns and the physical arrangement of the air guns in that air gun subarray.

In order to repeatedly produce and transmit pressure pulses having known characteristics under water, it is important that the air gun subarray is maintained at a constant depth below the water surface and in a near straight line horizontal position. Air gun subarrays presently in use are generally more than fifty (50) feet long and weigh several hundred pounds. To tow such an air gun subarray below the water surface, it is a common practice in the art of seismic surveying to pivotally attach a single or multiple floatation devices (buoys) along the length of the air gun subarray by means of a plurality of links. The floatation device maintains the air gun subarray at or near a constant depth below the water surface when the subarray and the floatation device combination (or the seismic source system) are towed behind a vessel.

Conventional floatation systems for use in marine seismic acquisition typically consist of sealed metallic containers, sealed members having solid floatation material in separate compartments, or sealed members that communicate with one another using a series of valves and a regulated air supply. Flotation systems consisting of sealed metal containers frequently suffer from premature failure in operation because of water infiltration of the inflexible metal container. Floatation systems consisting of sealed members having solid floatation materials in separate compartments are complex and difficult to monitor in operation. Floatation systems consisting of sealed members that communicate with one another and include a regulated air supply are complex and require a regulated power supply, valving, and a controller.

The present invention is directed to overcoming one or more of the limitations of the existing floatation systems used for marine seismic energy source.

SUMMARY OF THE INVENTION

According to one aspect of the present invention, a floatation device for a marine seismic energy source is provided that includes a head float, n tubular members coupled to the head float, n-1 couplings coupled to the tubular members for sealing an end portion of the tubular members, each coupling including an air valve, and a tail member coupled to an end portion of one of the tubular members for sealing the end portion of the one tubular member.

According to another aspect of the present invention, a marine seismic energy source is provided that includes a floatation device and one or more marine seismic energy sources coupled to the floatation device. The floatation device includes a head float, n tubular members coupled to the head float, n-1 couplings coupled to the tubular members for sealing an end portion of the tubular members, each coupling including an air valve; and a tail member coupled to an end portion of one of the tubular members for sealing the end portion of the one tubular member.

According to another aspect of the present invention, a marine seismic acquisition system is provided that includes a controller for controlling the operation of the marine seismic acquisition system, one or more marine seismic sensors for monitoring seismic energy coupled to the controller, and a marine seismic energy source for generating seismic energy coupled to the controller. The marine seismic energy source includes a floatation device and one or more marine seismic energy sources coupled to the floatation device. The floatation includes a head float, n tubular members coupled to the head float, n-1 couplings coupled to the tubular members for sealing an end portion of the tubular members, each coupling including an air valve; and a tail member coupled to an end portion of one of the tubular members for sealing the end portion of the one tubular member.

In accordance with another aspect of the present invention, a floatation member is provided that includes a tubular member having an interior chamber with first and second ends, a first sealing member for sealing the first end of the interior chamber of the tubular member, and a second sealing member for sealing the second end of the interior chamber of the tubular member. At least one of the sealing members includes a valve for injecting a buoyant fluid into the interior chamber of the tubular member.

In accordance with another aspect of the present invention, a sealing member for sealing a hollow tubular member is provided that includes a hollow tubular housing having a first end and a second end, a partition positioned within the hollow tubular housing for dividing the interior of the hollow tubular housing into a first interior portion and a second interior portion, and a valve coupled to the hollow tubular housing.

In accordance with another aspect of the present invention, a method of operating a marine seismic energy system is provided that includes providing a plurality of separate flexible buoyant members, coupling the flexible buoyant members, injecting a buoyant fluid into the flexible buoyant members; and supporting at least one marine seismic source beneath the surface of a body of water using one or more of the buoyant members.

In accordance with another aspect of the present invention, a method of floating one or more elements below the surface of a body of water is provided that includes providing a tubular floatation member, sealing the end of the tubular floatation member, injecting a buoyant fluid into the tubular floatation member adjacent to one of the ends of the tubular floatation member, and supporting one or more elements below the surface of a body of water using the tubular floatation member.

In accordance with another aspect of the present invention, a method of joining floatation devices is provided that includes providing a flexible hollow coupling including a valve for injecting a buoyant fluid into the floatation devices.

DETAILED DESCRIPTION OF THE ILLUSTRATIVE EMBODIMENTS

A floatation device for marine seismic energy sources is provided. The floatation device preferably includes a head float, a plurality of tubular members, couplings, and a tail member. Each of the tubular members in combination with a pair of the couplings provide a sealed floatation member. Furthermore, each of the couplings includes an air valve for injecting a buoyant fluid into the interior of the tubular members. In this manner, the floatation device provides a compact and modular floatation device that preferably includes a plurality of buoyant members. Furthermore, in this manner, the length of the floatation device may be easily adjusted in operation by adding or subtracting tubular members and couplings. While illustrated in an exemplary embodiment as a floatation device for marine seismic energy sources, the present floatation device will have wide application to any number of applications that would be enhanced by the application of a modular floatation device.

Figure 1:
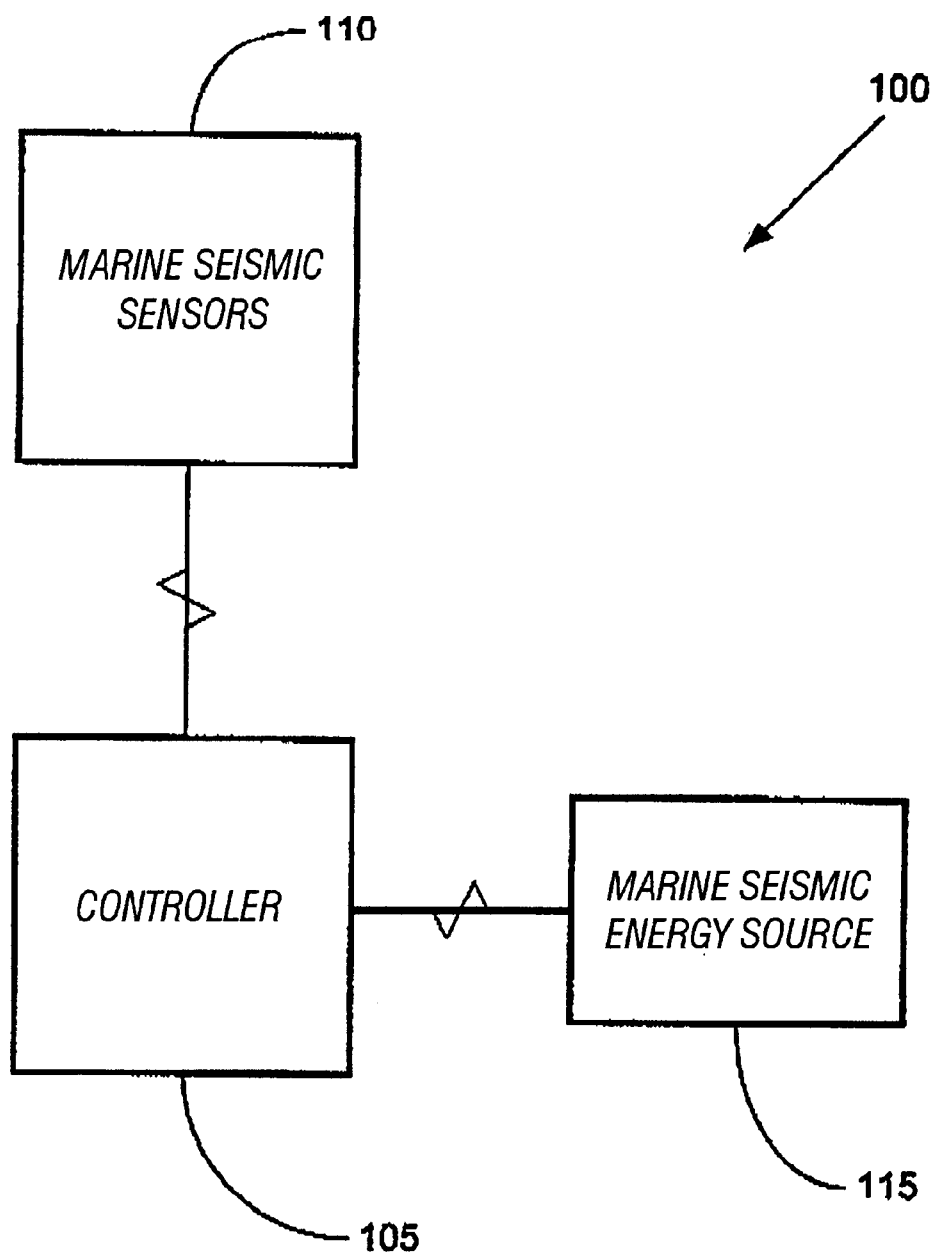
FIG. 1 is a schematic illustration of an embodiment of a marine seismic acquisition system.

Referring initially to FIG. 1, a marine seismic acquisition system 100 includes a controller 105, one or more marine seismic sensors 110, and a marine seismic energy source 115. The marine seismic acquisition system 100 preferably monitors and controls the collection of seismic data for a subterranean formation.

The controller 105 controls the operation of the marine seismic acquisition system 100. The controller 105 may comprise any number of conventional commercially available controllers for marine seismic acquisition such as, for example, a WG-24 or Syntrac. In a preferred embodiment, the controller 105 comprises any one of the commercially available controllers from Input/Output, Inc. in Stafford, Tex.

The marine seismic sensors 110 sense seismic energy and generate electrical signals representative of the measured seismic energy. The marine seismic sensors 110 are operably coupled to the controller 105. The marine seismic sensors 110 may comprise any number of conventional commercially available marine seismic sensors such as, for example, WG-24 or Syntrac. In a preferred embodiment, the marine seismic sensors 110 comprise any one of the commercially available marine seismic sensors from Input/Output, Inc. in Stafford, Tex.

The marine seismic energy source 115 is operably coupled to the controller 105. The marine seismic energy source 115 generates seismic energy in a well known manner under the control of the controller 105.

Referring to FIGS. 2–13, in a preferred embodiment, the marine seismic energy source 115 includes a floatation device 200 and one or more energy sources 205. The floatation device 200 is preferably adapted to float on the surface 210 of a body of water 215. The floatation device 200 further is preferably adapted to support one or more energy sources 205 positioned below the surface 210 of the body of water 215.

Figure 2:
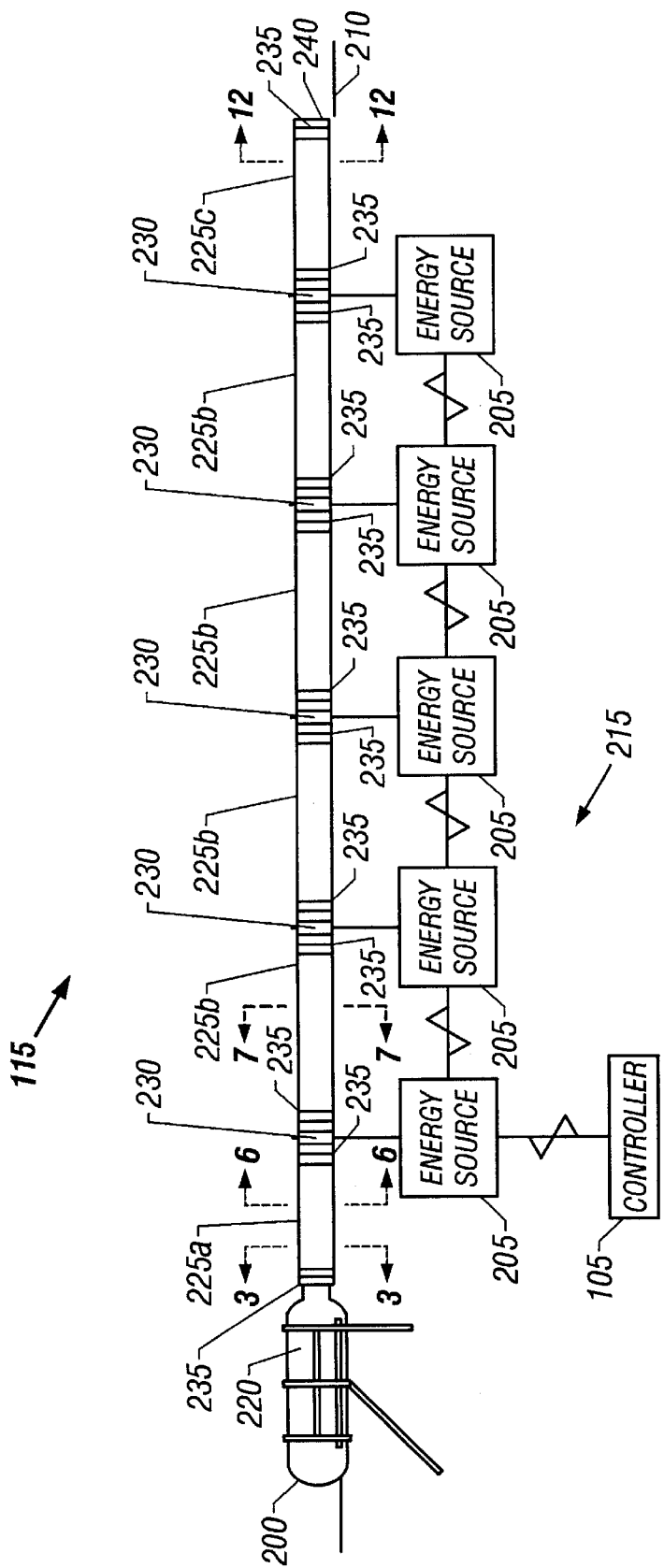
FIG. 2 is an illustration of an embodiment of a floatation device for marine seismic energy sources for use in the marine seismic acquisition system of FIG. 1.

As illustrated in FIG. 2, in a preferred embodiment, the floatation device 200 includes a head float 220, a first tubular member 225a, one or more intermediate tubular members 225b, a last tubular member 225c, couplings 230, clamps 235, and a tail member 240. In the general application of the floatation device 200, the device 200 includes a head float 220, n tubular members 225, n-1 couplings 230, and a tail member 240.

Figure 3:
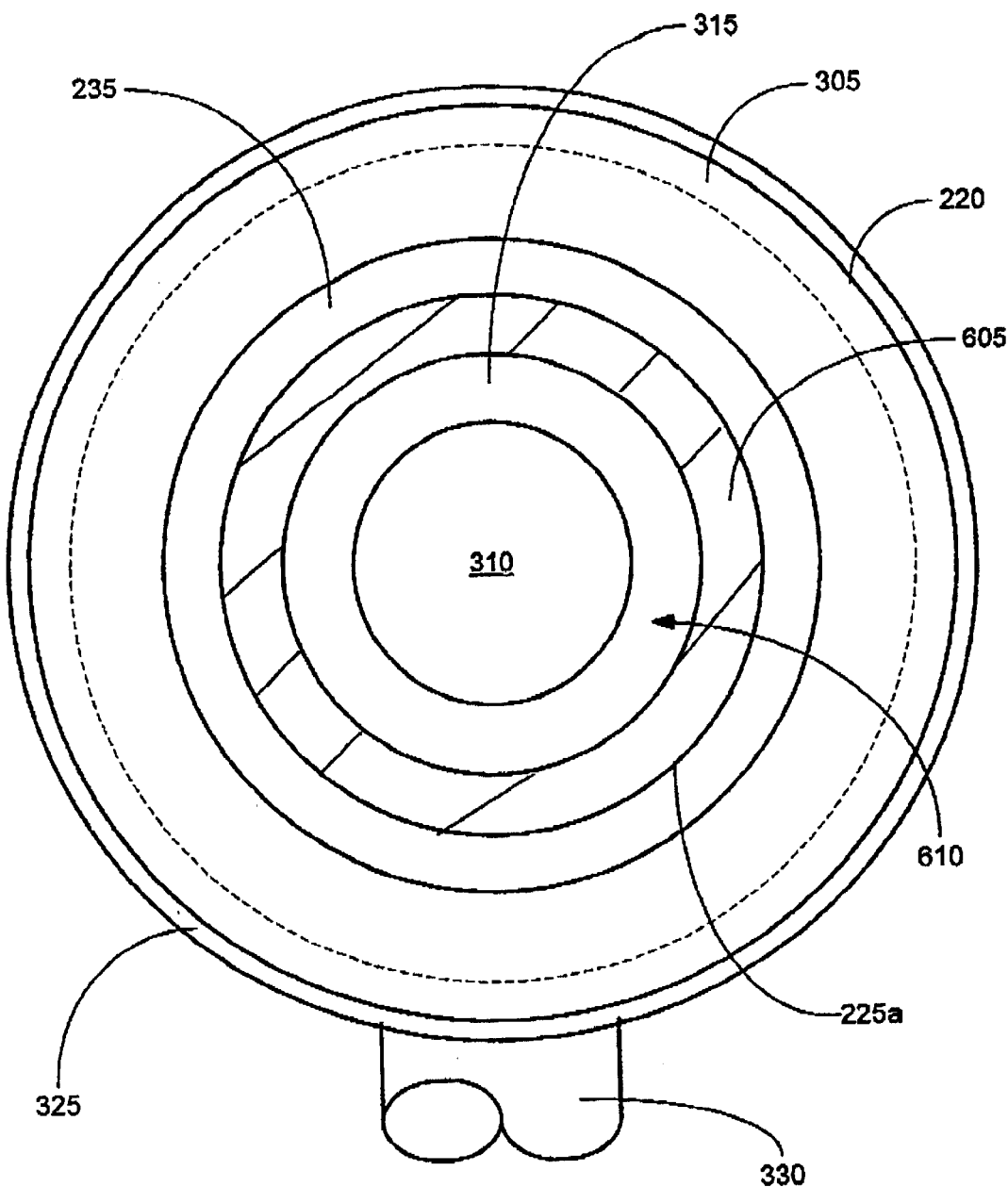
FIG. 3 is a cross-sectional illustration and view of the floatation device of FIG. 2.
Figure 4:
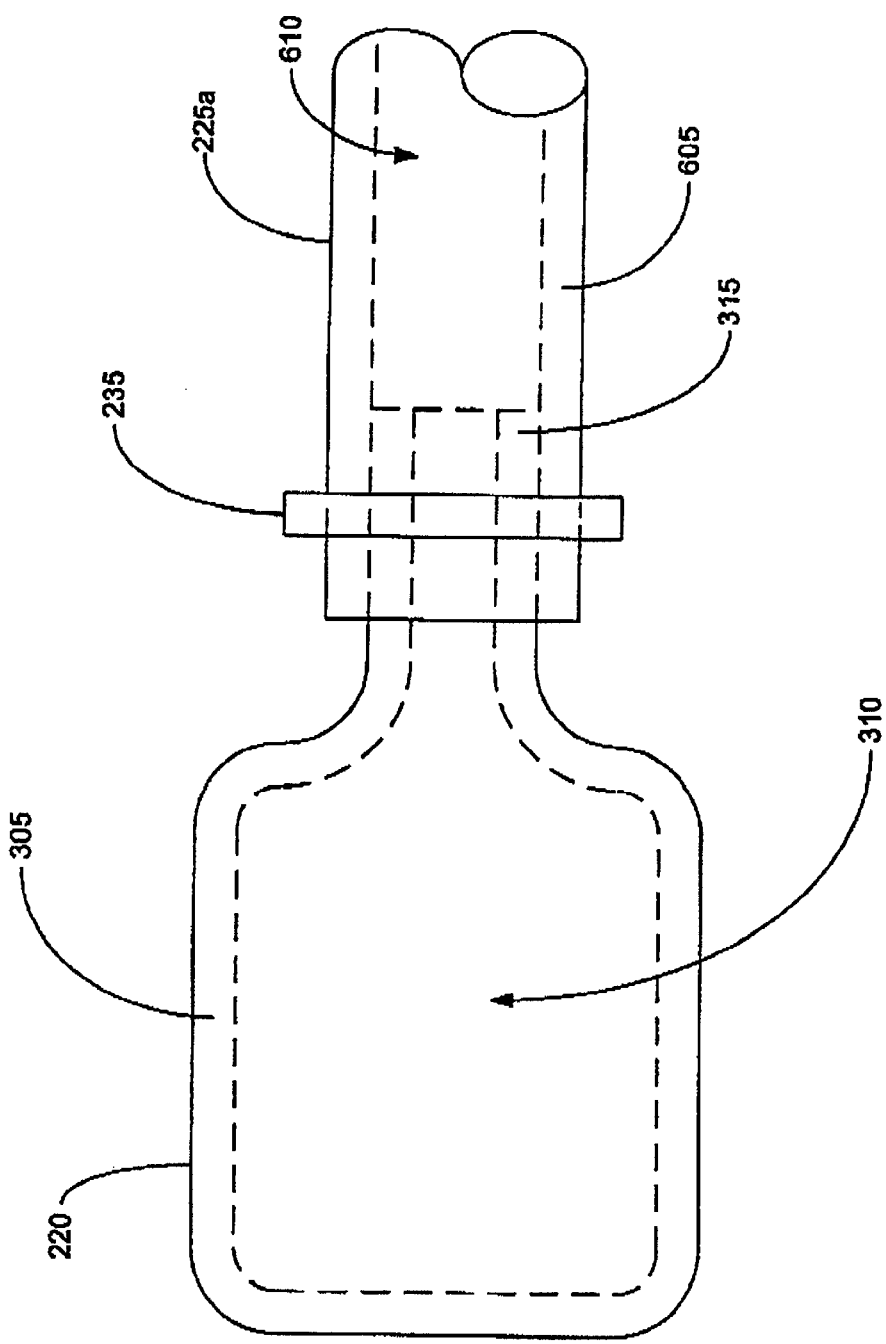
FIG. 4 is an illustration of an embodiment of the head float of the floatation device of FIG. 2.

The head float 220 is coupled to the first tubular member 225a. The head float 220 is preferably adapted to float on the surface 210 of the body of water 215. As illustrated in FIGS. 3 and 4, the head float 220 preferably includes an elongate body 305 having a hollow interior 310. In this manner, the interior 310 of the head float 220 may be filled with a buoyant fluid such as, for example, air.

In an alternative preferred embodiment, at least a portion of the interior 310 of the head float 220 comprises a solid floatation material such as, for example, Styrofoam. In this manner, the head float 220 is prevented from sinking below the surface 210 of the body of water 215 in the event of an air leak.

In a preferred embodiment, the body 305 of the head float 220 further includes an open end 315 adapted to fit within one end of the first tubular member 225a. In this manner, the interior of the head float 220 may be fluidicly coupled to the interior of the first tubular member 225a. In a preferred embodiment, the open end 315 of the body 305 of the head float 220 is removably coupled to the first tubular member 225a using a clamp 235. In a preferred embodiment, the clamp 235 provides sufficient force to ensure an air and fluid tight seal between the outer surface of the open end 315 of body 305 of the head float 220 and the inner surface of the first tubular member 225a.

Figure 5:
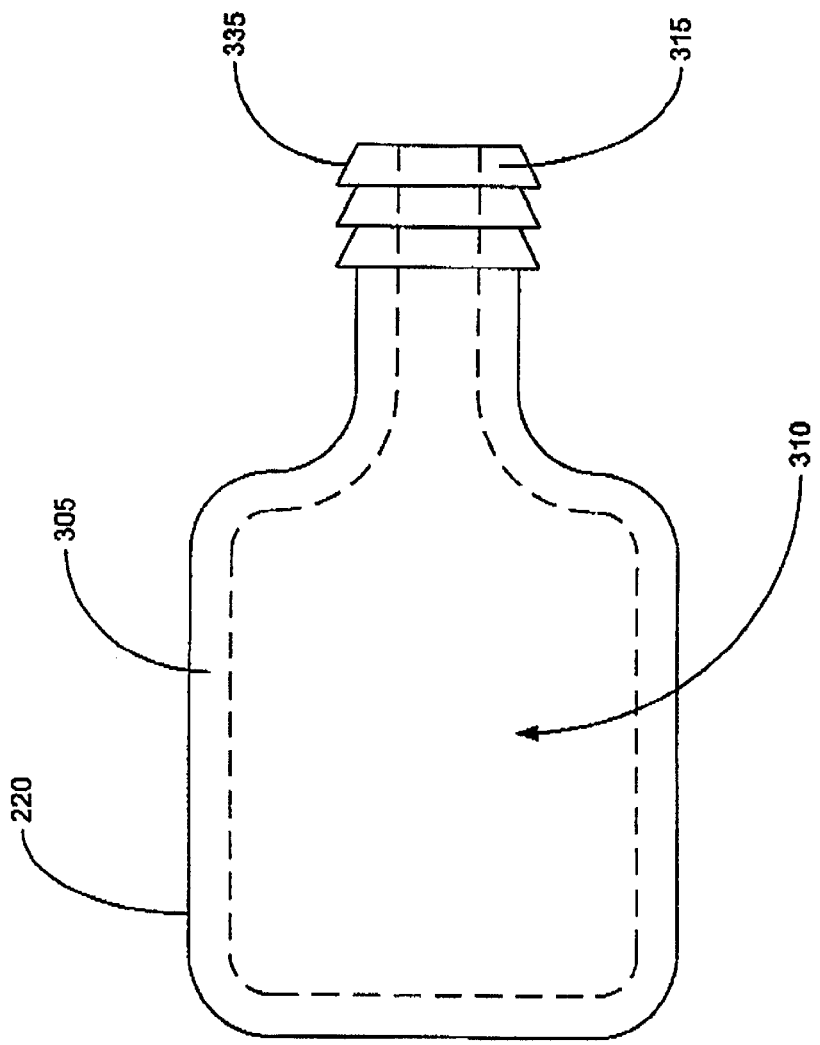
FIG. 5 is an illustration of another embodiment of the head float of FIG. 4.

As illustrated in FIG. 5, in a preferred embodiment, the exterior surface of the open end 315 of the body 305 of the head float 220 includes one or more ribbed surfaces 335 in order to enhance the connection between the open end 315 of the body 305 of the head float 220 and the first tubular member 225a. In a preferred embodiment, the exterior surface of the open end 315 of the body 305 of the head float 220 includes one or more flexible sealing members in order to optimally provide a fluid and air tight seal between the open end 315 of the body 305 of the head float 220 and the first tubular member 225a.

The body 305 of the head float 220 may be fabricated from any number of conventional commercially available materials such as, for example, polyethylene, PVC or fiberglass. In a preferred embodiment, the body 305 of the head float 220 is fabricated from polyethylene in order to optimally provide impact resistance.

The clamp 235 may comprise any number of conventional commercially available clamping devices such as, for example, hose clamps, bands or straps. In a preferred embodiment, the clamp 235 comprises multiple bands available from Band-It in order to optimally provide air tightness. In a preferred embodiment, the clamp 235 provides a contact pressure between the interior surface of the first tubular member 225a and the exterior surface of the head float 220 to provide a fluid and air tight seal between the first tubular member 225a and the head float 220.

In a preferred embodiment, a harness 325 is coupled to the outer surface of the body 305 of the head flow 220. In a preferred embodiment, the harness 325 is coupled to an anchoring device using a flexible cable 330. In this manner, the floatation device 200 may be positioned is a substantially stationary location on the surface 210 of the body of water 215. The harness 325 may comprise and number of conventional commercially available harnesses such as, for example, rope, chain or straps. In a preferred embodiment, the harness 325 comprises a formed metal strap in order to optimally provide a secure attachment location.

As illustrated in FIG. 2, the first tubular member 225a is preferably coupled to the head float 220 and to one of the couplings 230. The intermediate tubular members 225b are preferably each coupled to a pair of the couplings 230. The last tubular member 225c is preferably coupled to one of the couplings 230 and to the tail member 240. The tubular members, 225a, 225b and 225c, preferably comprise hollow elongate tubular bodies 605 having interior chambers 610. The tubular members 225a, 225b and 225c may be fabricated from any number of conventional commercially available materials such as, for example, urethane, synthetic rubber or polyethylene. In a preferred embodiment, the tubular members 225a, 225b and 225c are fabricated from reinforced synthetic rubber available from Unaflex in order to optimally provide flexibility and durability.

Figure 6:
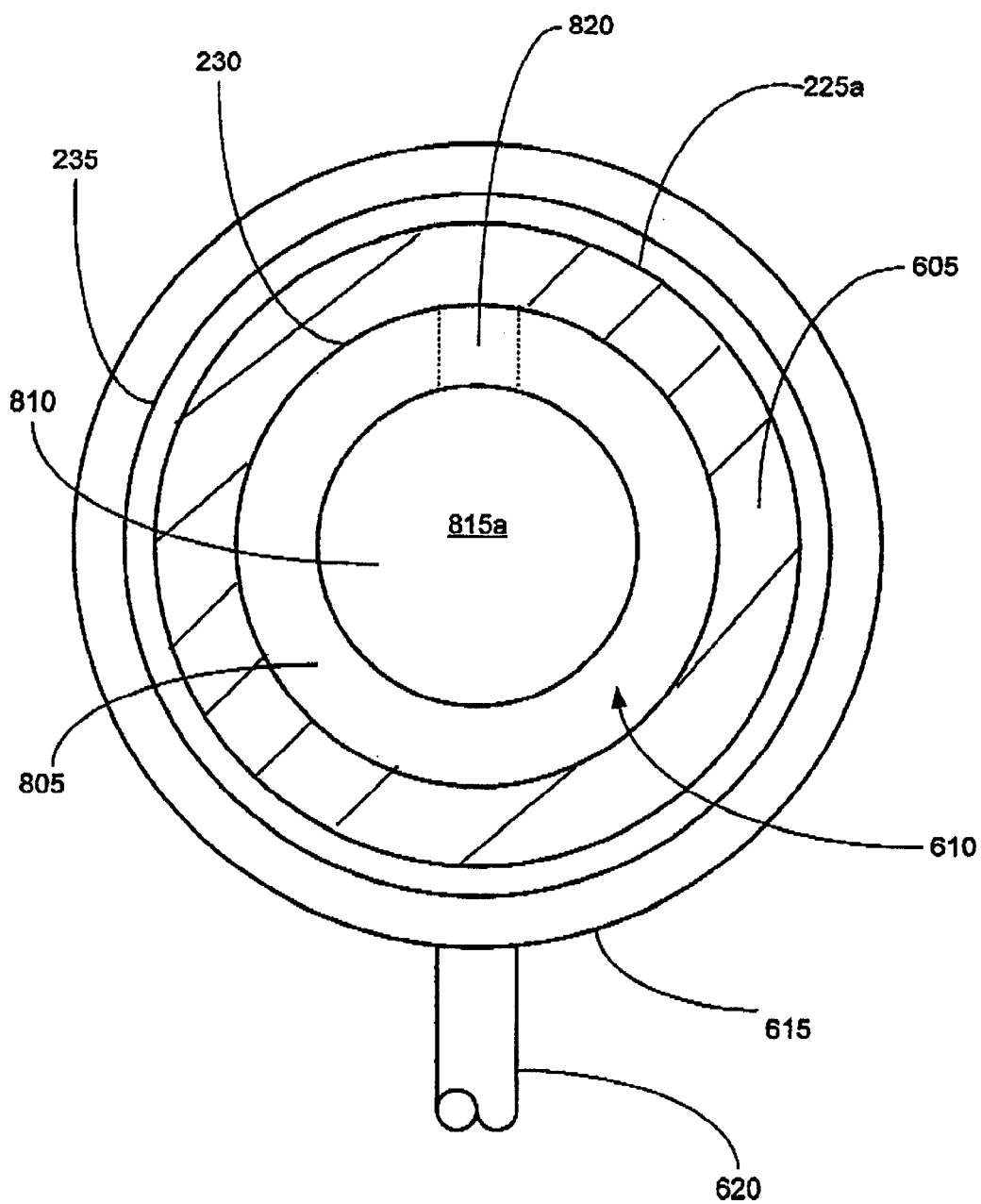
FIG. 6 is another cross-sectional illustration and view of the floatation device of FIG. 2.
Figure 7:
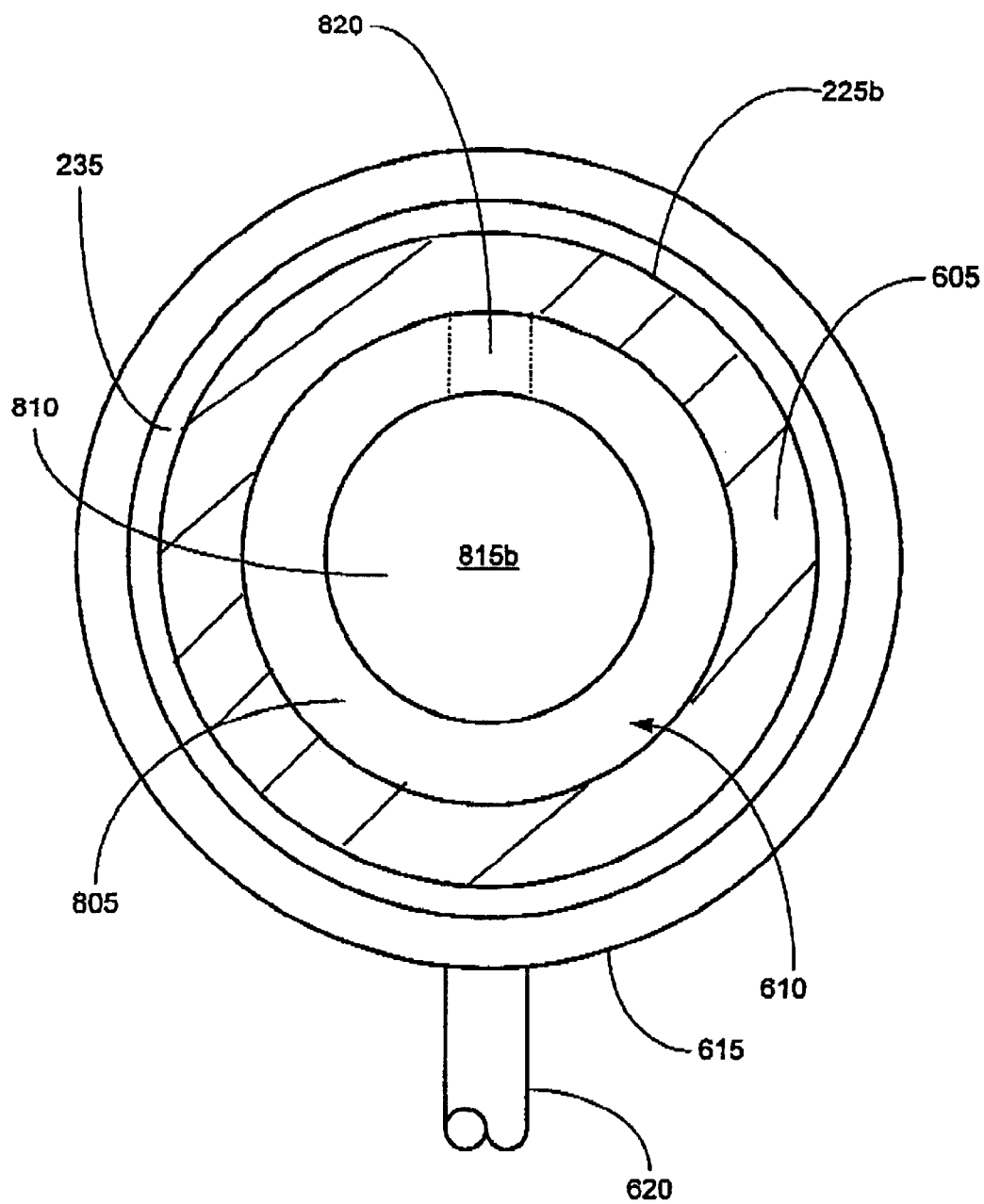
FIG. 7 is another cross-sectional illustration and view of the floatation device of FIG. 2.
Figure 8:
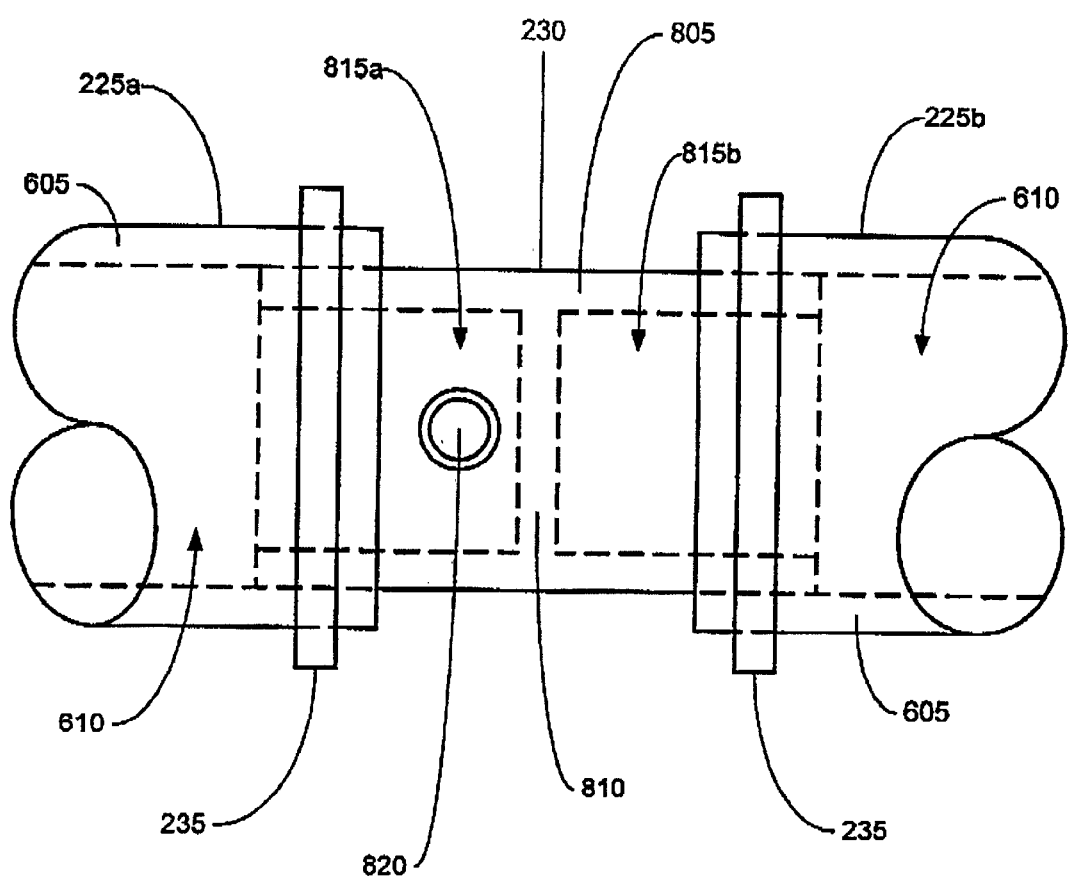
FIG. 8 is an illustration of an embodiment of the coupling of the floatation device of FIG. 2.

As illustrated in FIGS. 6, 7 and 8, each of the couplings 230 preferably comprise a substantially tubular body 805 including a partition 810 that separates the interior of the tubular body 805 into two interior chambers 815a and 815b. In a preferred embodiment, one of the interior chambers is fluidicly coupled to the interior of one of the tubular members 225 and the other one of the interior chambers is fluidicly coupled to the interior of another one of the tubular members 225. The couplings 230 may be fabricated from any number of conventional commercially available materials such as, for example, aluminum or plastic. In a preferred embodiment, the couplings 230 are fabricated from aluminum in order to optimally provide structural integrity, light weight, and corrosion resistance.

The couplings 230 further preferably include at least one valve 820 that permits a corresponding one of the interior chambers, 815a or 815b, to be injected with a buoyant fluid. The valve 820 may comprise any number of conventional commercially available valves such as, for example, ball, tank, or tire valves. In a preferred embodiment, the valve 820 comprises a large bore tire valve available from Haltec, Inc. in order to optimally provide rapid filling and automatic sealing. In an alternative embodiment, one or more of the couplings 230 include a separate valve 820 for each of the interior chambers, 815a and 815b. In this manner, both interior chambers, 815a and 815b, may be injected with a buoyant fluid. In a preferred embodiment, the buoyant fluid comprises air.

Figure 9:
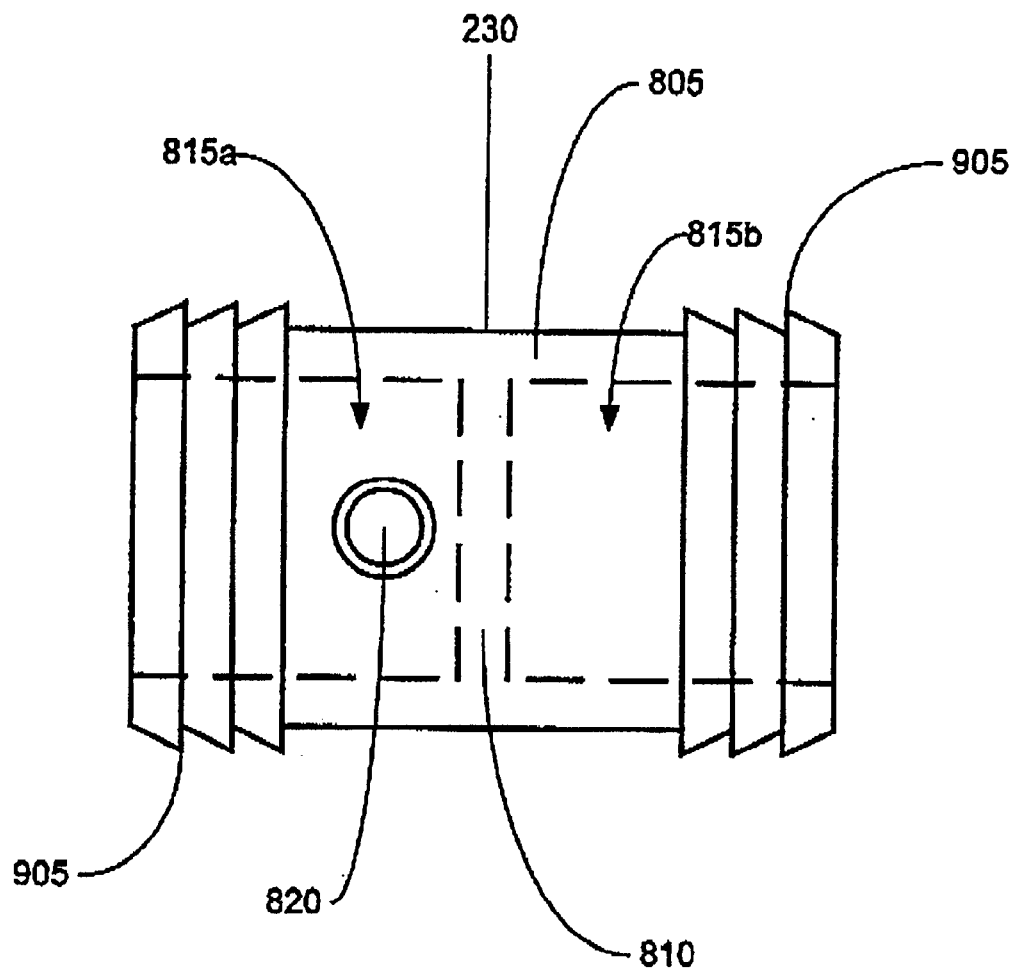
FIG. 9 is an illustration of another embodiment of the coupling of FIG. 8.

As illustrated in FIG. 9, in a particularly preferred embodiment, the couplings 230 include ribbed outer surfaces 905 at each end of the tubular body 805 in order to facilitate the coupling of the couplings 230 to the tubular members 225a, 225b and 225c. In a preferred embodiment, the outer surface of the couplings 230 include flexible sealing members at each end of the tubular body 805 in order to optimally provide a fluid and air tight seal between the couplings 230 and the tubular members 225a, 225b and 225c.

As illustrated in FIGS. 6, 7 and 8, the first tubular member 225a is coupled at one end to one of the couplings 230. In a preferred embodiment, the first tubular member 225a is coupled to one of the couplings 230 by inserting one end of the tubular body 805 of the coupling 230 into the interior chamber 610 of the tubular body 605 of the first tubular member 225a. In this manner, the interior chamber 610 of the first tubular member 225a is fluidicly coupled to the interior chamber 815a of the coupling 230. Furthermore, in this manner the interior chamber 310 of the head float 220 is also preferably fluidicly coupled to the interior chamber 815a of the coupling 230. In this manner, the interior chambers, 310 and 610, of the head float 220 and first tubular member 225a may be injected with a buoyant fluidic material using the valve 820 of the coupling 230.

As illustrated in FIG. 2, the intermediate tubular members 225b are coupled at both ends to one of the couplings 230. As illustrated in FIGS. 2, 6, 7 and 8, in a preferred embodiment, the intermediate tubular members 225b are coupled to the couplings 230 by inserting one end of the tubular body 805 of one of the couplings 230 into one end of the interior chamber 610 of the tubular body 605 of the intermediate tubular member 225a, and by inserting one end of the tubular body 805 of another one of the couplings 230 into the other end of the interior chamber 610 of the tubular body 605 of the intermediate tubular member 225a. In this manner, the interior chambers 610 of the intermediate tubular members 225a are fluidicly coupled to the interior chambers, 815a and 815b, of the pair of couplings 230. Furthermore, in this manner, the interior chambers, 815a and 815b, of the pair of couplings 230 and interior chamber 610 of the intermediate tubular members 225b may be injected with a buoyant fluidic material by using the valve 820 of one of the couplings 230. In an alternative embodiment, the couplings 230 include a separate valve for each of the interior chambers, 815a and 815b.

In a preferred embodiment, clamps 235 are used to compress the interior surface of the intermediate tubular members 225b onto the exterior surfaces of the ends of the couplings 230. In a preferred embodiment, the clamps 235 provide a contact pressure between the intermediate tubular members 225b and the couplings 230 that ranges from about 5 to 10 psi in order to optimally provide a fluid and air tight seal between the intermediate tubular members 225b and the couplings 230.

In a preferred embodiment, a harness 615 is coupled to the exterior surface of each of the couplings 230 for supporting a corresponding one of the marine seismic energy source 205. In a preferred embodiment, a flexible cable 620 is used to couple the harness 615 to the marine seismic energy source 205.

Figure 12:
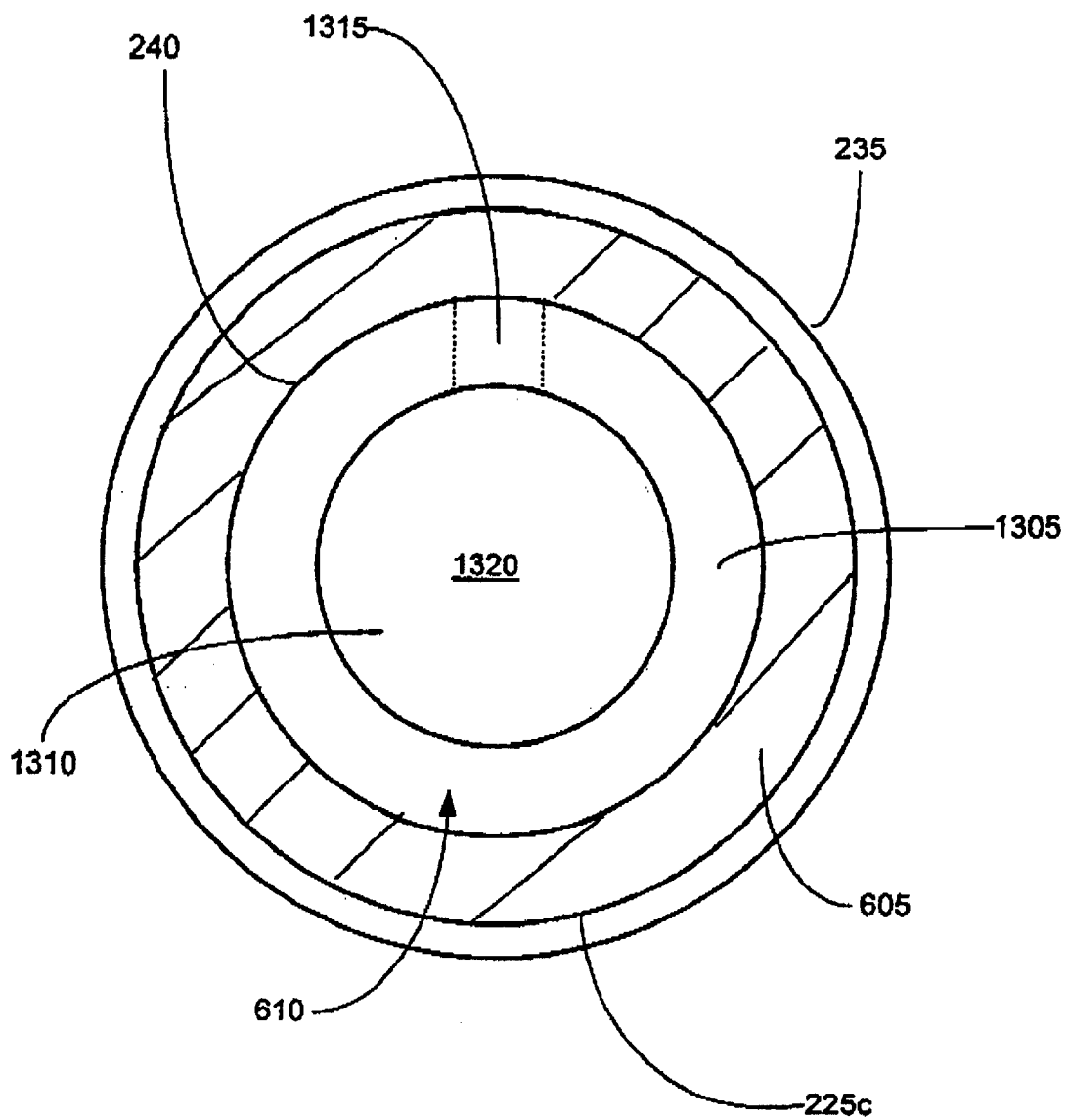
FIG. 12 is another cross-sectional illustration and view of the floatation device of FIG. 2.
Figure 13:
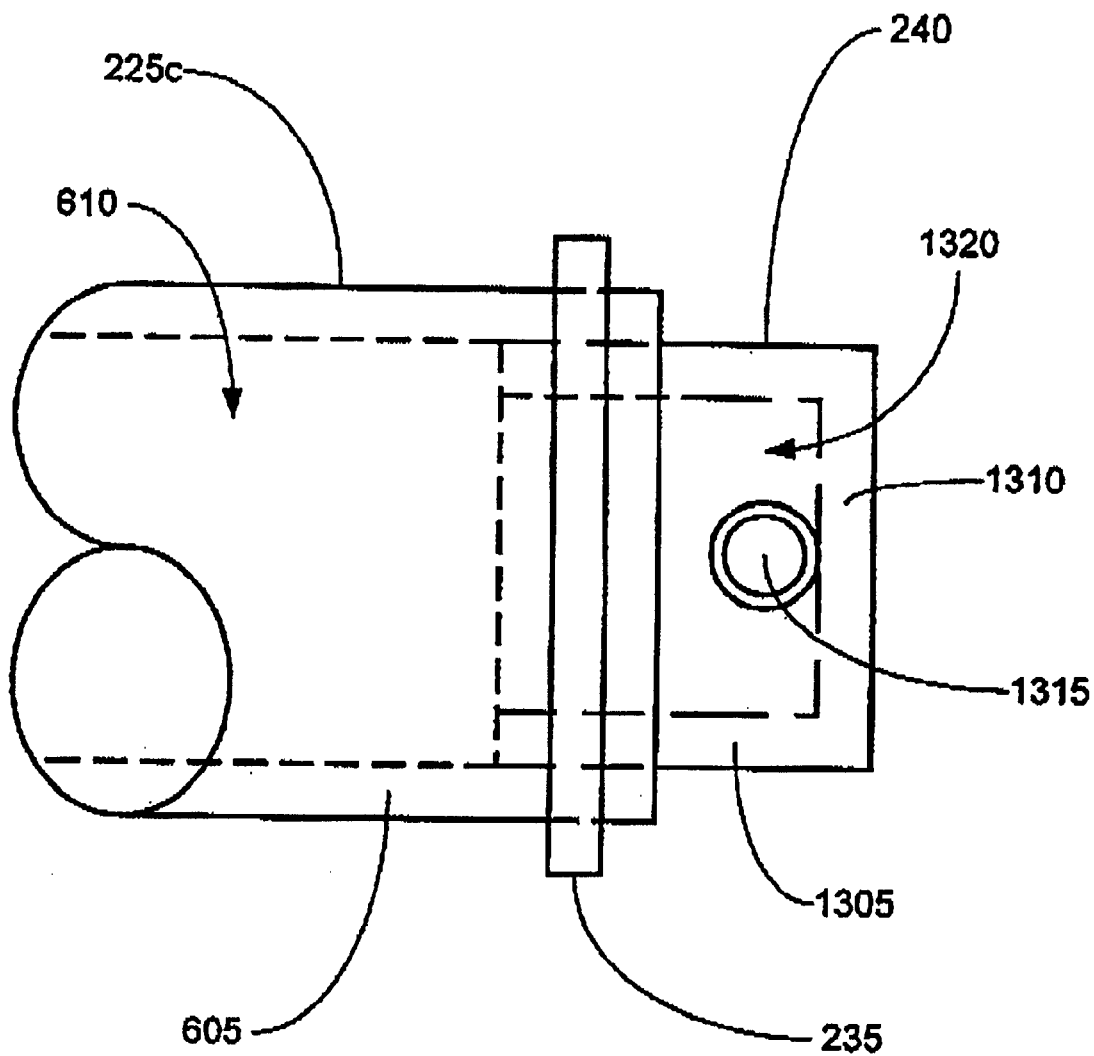
FIG. 13 is an illustration of an embodiment of the tail member of the floatation device of FIG. 2.

As illustrated in FIGS. 2, 12 and 13, the last tubular member 225c is coupled to one of the couplings 230 and to the tail member 240. The connection of one end of the last tubular member 225c to one end of one of the couplings 230 is preferably provided substantially as described above with reference to the connection of the intermediate tubular members 225b to the couplings 230.

The tail member 240 preferably includes a tubular elongate body 1305 having an end wall 1310, a valve 1315, and an interior chamber 1320. The tubular body 1305 of the tail member 240 may be fabricated from any number of conventional commercially available materials such as, for example, steel, aluminum or plastic. In a preferred embodiment, the tubular body 1305 of the tail member 240 is fabricated from aluminum.

The last tubular member 225c is preferably coupled to the tail member 240 by inserting a portion of the open end of the tail member 240 into one end of the last tubular member 225c. In this manner, the inner chamber 610 of the last tubular member 225c is fluidicly coupled to the interior chamber 1320 of the tail member 240. Furthermore, in this manner, the interior chamber 815b of the coupling 230, that is coupled to the other end of the last tubular member 225c, is fluidicly coupled to the interior chamber 610 of the last tubular member 225c and the interior chamber 1320 of the tail member 240. In a preferred embodiment, the interior chamber 815b of the coupling 230, that is coupled to the other end of the last tubular member 225c, the interior chamber 610 of the last tubular member 225c, and the interior chamber 1320 of the tail member 240 are injected with a buoyant fluid using the valve 1315. The valve 1315 may comprise any number of conventional commercially available valves such as, for example, ball, tank or tire valves. In a preferred embodiment, the valve 1315 comprises a large bore tire valve available from Haltec, Inc. in order to optimally provide rapid filling and automatic sealing. In an alternative embodiment, the last tubular member 225c is coupled at both ends to one of the couplings 230. In this manner, additional tubular members 225 are easily added to the floatation device 200.

Figure 14:
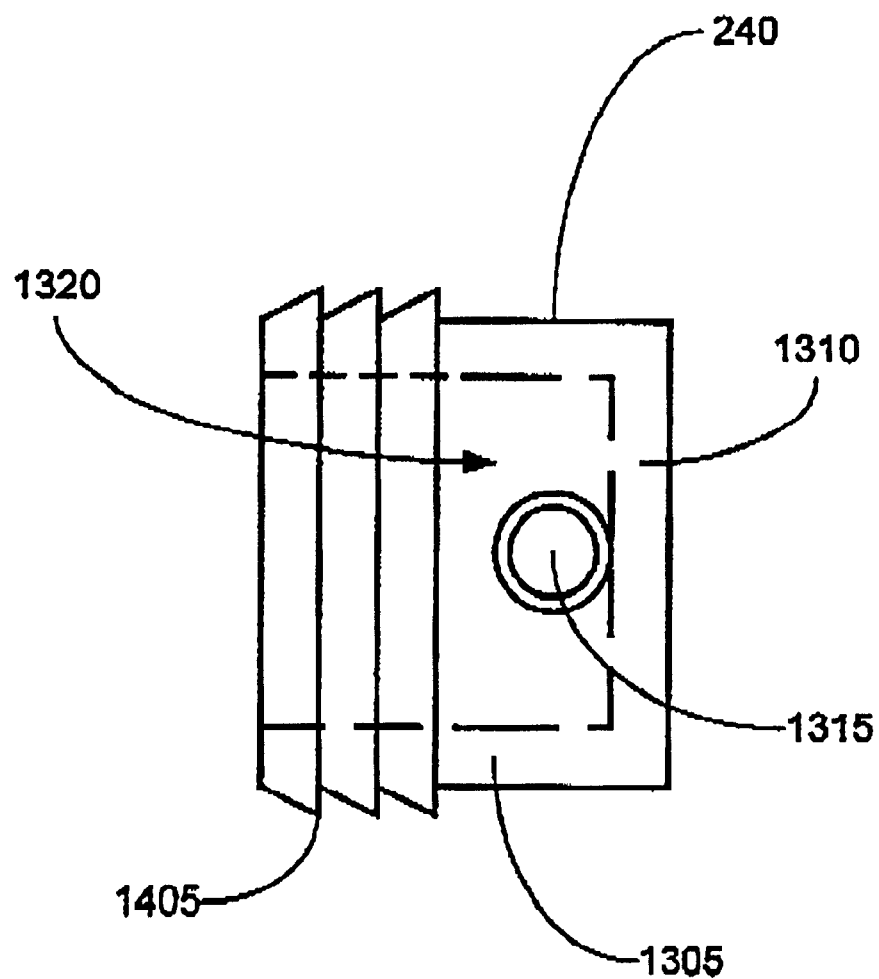
FIG. 14 is an illustration of another embodiment of the tail member of FIG. 13.

In a preferred embodiment, a clamp 235 is used to compress the interior surface of one end of the last tubular member 225c onto the exterior surface of the open end of the tail member 240. In a preferred embodiment, the clamp 235 provides a contact pressure between the interior surface of one end of the last tubular member 225c and the exterior surface of the open end of the tail member 240 that ranges from about 5 to 10 psi in order to optimally provide a fluid and air tight seal between the last tubular member 225c and the tail member 240. In a preferred embodiment, as illustrated in FIG. 14, the exterior surface of the open end of the tail member 240 includes one or more ribbed surfaces 1405 to facilitate the connection between the last tubular member 225c and the open end of the tail member 240. In a preferred embodiment, the exterior surface of the open end of the tail member 240 includes one or more flexible sealing members in order to optimally provide a fluid and air tight seal between the last tubular member 225c and the open end of the tail member 240.

The energy sources 205 are coupled to the harnesses 615 and 620. The energy sources 205 are preferably positioned below the surface 210 of the body of water 215. The energy sources 205 may comprise any number of conventional commercially available marine seismic energy sources such as, for example, air guns, gas exploder or vibrators. In a preferred embodiment, the energy sources 205 comprise air guns available from Input/Output, Inc. in Stafford, Tex.

Thus, the floatation device 200 preferably includes a plurality of buoyant members that include: (1) the combination of the head float 220, first tubular member 225a, and a coupling 230; (2) the combination of at least one intermediate tubular member 225b and a pair of couplings 230; and (3) the last tubular member 225c and a coupling 230 and the tail member 240. Each of these buoyant members are preferably injected with a buoyant fluid such as, for example, air using the valves positioned in the walls of the couplings 230 and the tail member 240. The design and construction of the floatation device 200 permits the number and length of the buoyant members to be easily adjusted in operation. In the general application of the floatation device 200, the device 200 includes: (1) a head float; (2) n tubular members; (3) n-1 couplings; and (4) a tail member. In an alternative embodiment, at least a portion of the interior of the head float 220 comprises a solid floatation material such as, for example, Styrofoam.

Figure 10:
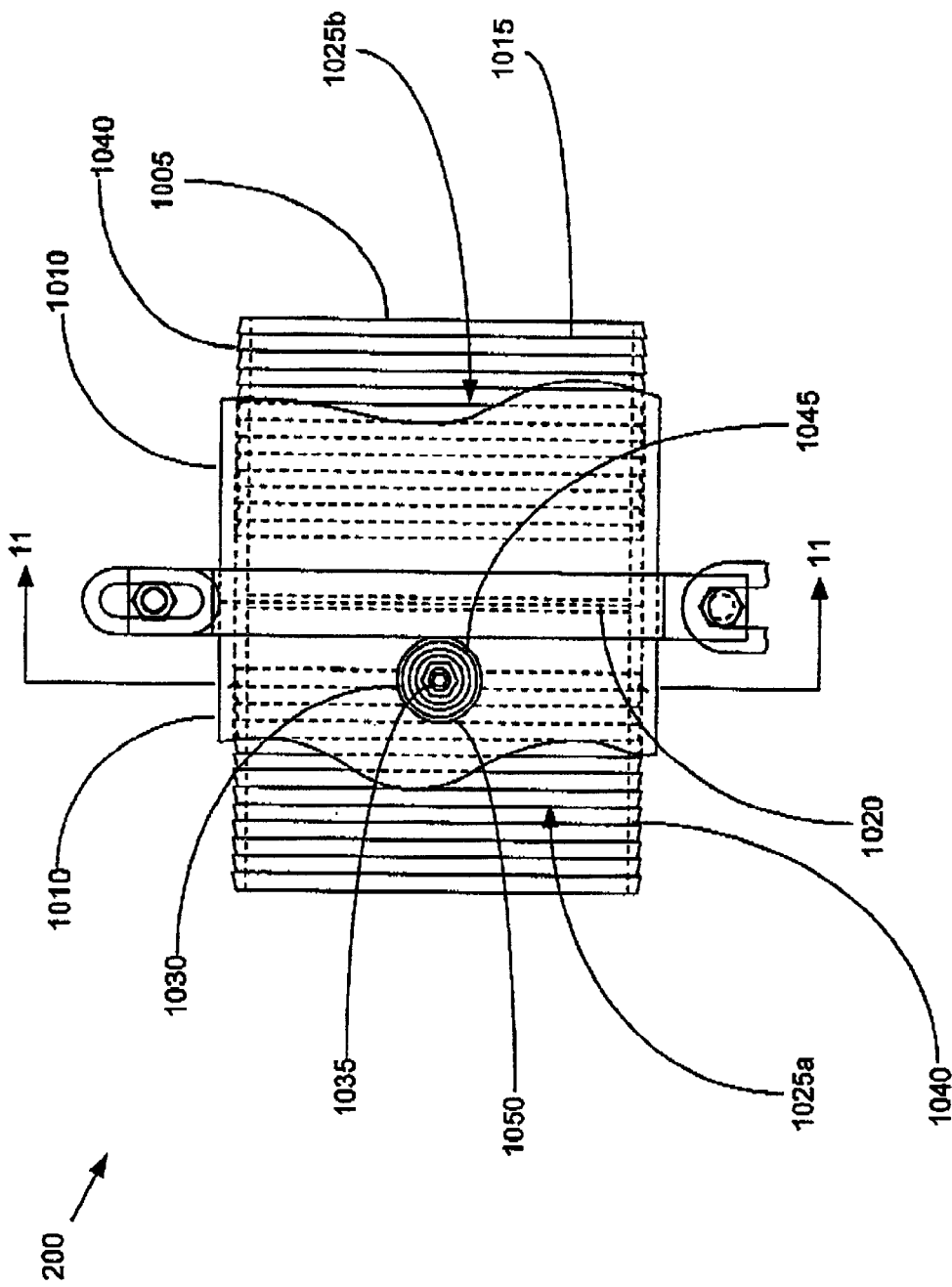
FIG. 10 is a fragmentary cross-sectional view of a preferred embodiment of the coupling of the floatation device of FIG. 2.
Figure 11:
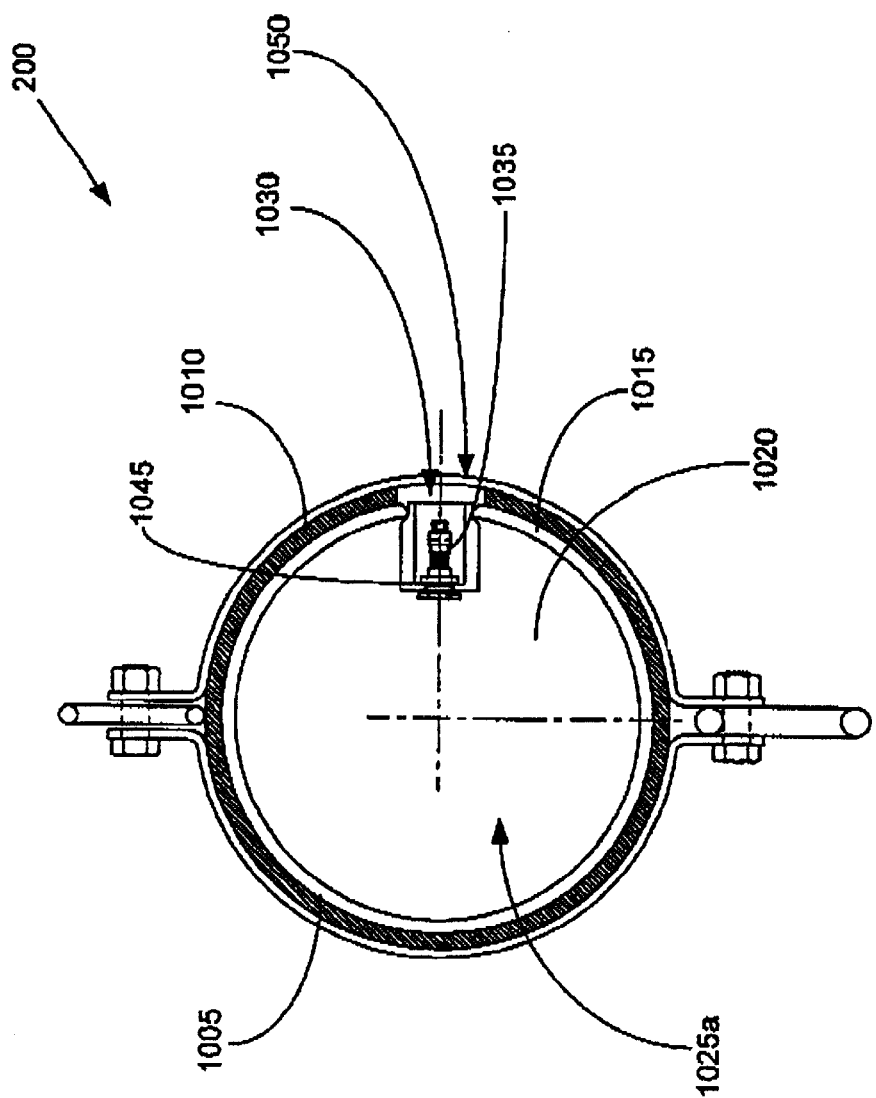
FIG. 11 is a cross-sectional illustration and view of the coupling of FIG. 10.

In a preferred embodiment, as illustrated in FIGS. 10 and 11, the floatation device 200 includes couplings 1005 and tubular members 1010.

The couplings 1005 include an elongate tubular body 1015 having a partition 1020, a first inner chamber 1025a, a second inner chamber 1025b, an opening 1030, a valve 1035, ribbed surfaces 1040, and a valve mounting member 1045. The partition 1020 divides the interior of the tubular body 1015 into the first and second inner chambers, 1025a and 1025b. The couplings 1005 may be fabricated from any number of conventional commercially available materials such as, for example, aluminum or plastic. In a preferred embodiment, the couplings 1005 are fabricated from aluminum in order to optimally provide light weight and high strength.

The opening 1030 in the side wall of the tubular body 1015 permits the valve mounting member 1045 to be mounted within the interior of the tubular body 1015. The valve 1035 permits the injection of a buoyant fluid into the inner chamber 1025a. The valve 1035 may comprise any number of conventional commercially available valves such as, for example, ball, tank, or tire valves. In a preferred embodiment, the valve 1035 comprises a large bore tire valve available from Haltec, Inc. in order to optimally provide rapid filling and automatic sealing.

The valve mounting member 1045 preferably comprises a tubular member having an end wall including a through hole for mounting the valve 1035. The open end of the valve mounting member 1045 preferably includes an outer groove that engages with the edges of the opening 1030 in the tubular body 1015 of the coupling 1005. In this manner, the valve mounting member 1045 is mounted within the interior of the tubular body 1015 of the coupling 1005. This permits the valve 1035 to be recessed below the outer surface of the tubular body 1015 of the coupling 1005.

The tubular members 1010 preferably comprise elongate tubular elements having an opening 1050 that corresponds to and matches up with the opening 1030 in the side wall of the tubular body 1015 of the couplings 1005. In this manner, the recessed valve 1025 may be accessed by an operator. The tubular members 1010 may be fabricated from any number of conventional commercially available materials such as, for example, urethane, synthetic rubber, polyethylene. In a preferred embodiment, the tubular members 1010 are fabricated from reinforced synthetic rubber available from Unaflex in order to optimally provide flexibility and durability.

In a preferred embodiment, the couplings 1005 include a separate valve for each of the inner chambers, 1025*a* and 1025*b*. In this manner, the tubular members 1010 coupled to each of the inner chambers, 1025*a* and 1025*b*, may be injected with a buoyant fluid using the same coupling 1005.

A floatation device for a marine seismic energy source has been described that includes a head float, n tubular members coupled to the head float, n-1 couplings coupled to the tubular members for sealing an end portion of the tubular members, each coupling including an air valve, and a tail member coupled to an end portion of one of the tubular members for sealing the end portion of the one tubular member. In a preferred embodiment, the tubular members comprise flexible tubular elements. In a preferred embodiment, the tubular members are fabricated from materials selected from the group consisting of urethane, synthetic rubber, and polyethylene. In a preferred embodiment, the couplings comprise: a tubular member having an interior divided by a partition into two sections, and an air valve coupled to one of the two interior sections. In a preferred embodiment, the tail member comprises: a tubular member having an interior section, and an air valve coupled to the interior section.

A marine seismic energy source has also been described that includes a floatation device and one or more marine seismic energy sources coupled to the floatation device. The floatation device includes: a head float, n tubular members coupled to the head float, n-1 couplings coupled to the tubular members for sealing an end portion of the tubular members, each coupling including an air valve, and a tail member coupled to an end portion of one of the tubular members for sealing the end portion of the one tubular member. In a preferred embodiment, the tubular members comprise flexible tubular elements. In a preferred embodiment, the tubular members are fabricated from materials selected from the group consisting of urethane, synthetic rubber and polyethylene. In a preferred embodiment, the couplings comprise: a tubular member having an interior divided by a partition into two sections, and an air valve coupled to one of the two interior sections. In a preferred embodiment, the tail member comprises: a tubular member having an interior section, and an air valve coupled to the interior section.

A marine seismic acquisition system has also been described that includes a controller for controlling the operation of the marine seismic acquisition system, one or more marine seismic sensors for monitoring seismic energy coupled to the controller, and a marine seismic energy source for generating seismic energy coupled to the controller. The marine seismic energy source includes a floatation device and one or more marine seismic energy sources coupled to the floatation device. The floatation device includes a head float, n tubular members coupled to the head float, n-1 couplings coupled to the tubular members for sealing an end portion of the tubular members, each coupling including an air valve; and a tail member coupled to an end portion of one of the tubular members for sealing the end portion of the one tubular member. In a preferred embodiment, the tubular members comprise flexible tubular elements. In a preferred embodiment, the tubular members are fabricated from materials selected from the group consisting of urethane, synthetic rubber and polyethylene. In a preferred embodiment, the couplings comprise: a tubular member having an interior divided by a partition into two sections, and an air valve coupled to one of the two interior sections. In a preferred embodiment, the tail member comprises: a tubular member having an interior section, an air valve coupled to the interior section.

A floatation member has also been described that includes a tubular member having an interior chamber with first and second ends, a first sealing member for sealing the first end of the interior chamber of the tubular member, and a second sealing member for sealing the second end of the interior chamber of the tubular member. At least one of the sealing members include a valve for injecting a buoyant fluid into the interior chamber of the tubular member.

A sealing member for sealing a hollow tubular member has also been described that includes a hollow tubular housing having a first end and a second end, a partition positioned within the hollow tubular housing for dividing the interior of the hollow tubular housing into a first interior portion and a second interior portion, and a valve coupled to the hollow tubular housing.

A method of operating a marine seismic energy system has also been described that includes providing a plurality of separate flexible buoyant members, coupling the flexible buoyant members, injecting a buoyant fluid into the flexible buoyant members, and supporting at least one marine seismic source beneath the surface of a body of water using one or more of the buoyant members.

A method of floating one or more elements below the surface of a body of water has also been described that includes providing a tubular floatation member, sealing the end of the tubular floatation member, injecting a buoyant fluid into the tubular floatation member adjacent to one of the ends of the tubular floatation member, and supporting one or more elements below the surface of a body of water using the tubular floatation member.

A method of joining floatation devices has also been described that includes providing a flexible hollow coupling including a valve for injecting a buoyant fluid into the floatation devices.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A floatation device for a marine seismic energy source, comprising:
   a head float;
   a plurality of tubular members coupled to the head float;
   a plurality of couplings coupled to the tubular members for sealing an end portion of each of the tubular members;
   a valve operatively associated with each of the tubular members for injecting a buoyant fluid into each of the tubular members separately; and
   a tail member coupled to an end portion of the plurality of tubular members for sealing the end portion.

2. The device of claim 1, wherein the tubular members comprise flexible tubular elements.

3. The device of claim 1, wherein the tubular members are fabricated from materials selected from the group consisting of urethane, synthetic rubber and polyethylene. second valve coupled to the interior section.

4. The device of claim 1, wherein the couplings comprise:
- a second tubular member having an interior divided by a partition into two sections, and
- a second valve coupled to one of the two interior sections.

5. The device of claim 1, wherein the tail member comprises:
- a third tubular member having an interior section;
- a second valve coupled to the interior section.

6. The device of claim 1, wherein the valves are recessed below an outer surface of the couplings.

7. A marine seismic acquisition system, comprising:
- a controller for controlling the operation of the marine seismic acquisition system;
- one or more marine seismic sensors for monitoring seismic energy coupled to the controller, and
- a marine seismic energy source for generating seismic energy coupled to the controller including:
  - a floatation device including:
    - a head float;
    - a plurality of tubular members coupled to the head float;
    - a plurality of couplings coupled to the tubular members for sealing an end portion of each of the tubular members;
    - a valve operatively associated with each of the tubular members for injecting a buoyant fluid into each of the tubular members separately; and
    - a tall member coupled to an end portion of one of the tubular members for sealing the end portion of the one tubular member; and
- one or more marine seismic energy sources coupled to the floatation device.

8. The system of claim 7, wherein the tubular members comprise flexible tubular elements.

9. The system of claim 7, wherein the tubular members are fabricated from materials selected from the group consisting of urethane, synthetic rubber, and polyethylene.

10. The system of claim 7, wherein the couplings comprise:
- a second tubular member having an interior divided by a partition into two sections; and
- a second valve coupled to one of the two interior sections.

11. The system of claim 7, wherein the tail member comprises:
- a third tubular member having an interior section;
- a second valve coupled to the interior section.

12. A method of floating one or more elements below the surface of a body of water, comprising;
- providing a tubular floatation member having a plurality of buoyant members;
- sealing first and second ends of each of the plurality of buoyant members;
- injecting a buoyant fluid into each of the sealed buoyant members adjacent to one of the first and second ends; and
- supporting one or more elements below the surface of a body of water using the tubular floatation member.

13. The method of claim 12, wherein sealing first and second ends of each of the plurality of buoyant members is coupling the flexible buoyant members such that each flexible buoyant member is sealed from the other flexible buoyant members.

14. The method of claim 12, wherein the supporting one or more elements below the surface of a body of water is supporting one or more marine seismic sources below the surface of a body of water.

* * * * *

UNITED STATES PATENT AND TRADEMARK OFFICE
CERTIFICATE OF CORRECTION

PATENT NO.    : 6,301,193 B1
DATED         : October 9, 2001
INVENTOR(S)   : Dallas Martin and David C. Charvoz It is certified that error appears in the above-identified patent and that said Letters Patent is hereby corrected as shown below:

Column 10,
Line 66, please delete "second valve".
Line 67, please delete "coupled to the interior section.".

Column 11,
Line 7, please insert -- and -- after "section;"
Line 28, please delete "tall" and insert -- tail--.

Column 12,
Line 11, please insert -- and -- after "section;".

Signed and Sealed this

Sixteenth Day of March, 2004

JON W. DUDAS
*Acting Director of the United States Patent and Trademark Office*